United States Patent
Ohodnicki et al.

(10) Patent No.: US 12,013,285 B2
(45) Date of Patent: Jun. 18, 2024

(54) HIGH TEMPERATURE NEAR-FIELD PROBE FOR SENSING AND ENERGY HARVESTING APPLICATIONS BASED UPON THERMAL EMISSION

(71) Applicants: UNIVERSITY OF PITTSBURGH-OF THE COMMONWEALTH SYSTEM OF HIGHER EDUCATION, Pittsburgh, PA (US); CARNEGIE MELLON UNIVERSITY, Pittsburgh, PA (US)

(72) Inventors: Paul Richard Ohodnicki, Allison Park, PA (US); Sheng Shen, Pittsburgh, PA (US)

(73) Assignees: UNIVERSITY OF PITTSBURGH—OF THE COMMONWEALTH SYSTEM OF HIGHER EDUCATION, Pittsburgh, PA (US); CARNEGIE MELLON UNIVERSITY, Pittsburgh, PA (US)

(*) Notice: Subject to any disclaimer, the term of this patent is extended or adjusted under 35 U.S.C. 154(b) by 135 days.

(21) Appl. No.: 17/233,819

(22) Filed: Apr. 19, 2021

(65) Prior Publication Data

US 2021/0325241 A1 Oct. 21, 2021

Related U.S. Application Data

(60) Provisional application No. 63/011,377, filed on Apr. 17, 2020.

(51) Int. Cl.
G01J 1/04 (2006.01)
G02B 6/42 (2006.01)

(52) U.S. Cl.
CPC .......... G01J 1/0425 (2013.01); G02B 6/4206 (2013.01)

(58) Field of Classification Search
CPC G02B 2207/101; G02B 5/008; G02B 6/4206; G02B 6/1226; G01J 3/108; G01J 1/0425; G01J 5/0821
See application file for complete search history.

(56) References Cited

U.S. PATENT DOCUMENTS

| | | | | |
|---|---|---|---|---|
| 5,364,186 A | * | 11/1994 | Wang | G01J 5/08021 374/126 |
| 7,772,555 B2 | * | 8/2010 | Hollingsworth | G02B 6/241 356/519 |

(Continued)

FOREIGN PATENT DOCUMENTS

| | | | | |
|---|---|---|---|---|
| CA | 3083731 A1 | * | 5/2019 | ............ E21B 47/06 |
| CN | 102324238 B | * | 7/2014 | ............ G11B 5/314 |

(Continued)

OTHER PUBLICATIONS

"Thermal Emissivity-Based Chemical Spectroscopy Through Evanescent Tunneling", Z. L. Poole, P. R. Ohodnicki, Advanced Materials 28 (16), 3111-3114 (2016).

(Continued)

*Primary Examiner* — Michelle R Connelly
*Assistant Examiner* — Mary A El-Shammaa
(74) *Attorney, Agent, or Firm* — Philip E. Levy; ECKERT SEAMANS CHERIN & MELLOTT, LLC (57) ABSTRACT

A near-field probe (and associated method) compatible with near-infrared electromagnetic radiation and high temperature applications above 300° C. (or 500° C. in some applications) includes an optical waveguide and a photonic thermal emitting structure comprising a near-field thermally emissive material coupled to or part of the optical waveguide. The photonic thermal emitting structure is structured and configured to emit near-field energy responsive to at least one environmental parameter of interest, and the near-field probe is structured and configured to enable extraction (Continued)

of the near-field energy to a far-field by coupling the near-field energy into one or more guided modes of the optical waveguide.

9 Claims, 6 Drawing Sheets

(56) References Cited

U.S. PATENT DOCUMENTS

| | | | | |
|---|---|---|---|---|
| 9,964,494 | B1 | 5/2018 | Poole et al. | |
| 2004/0258130 | A1* | 12/2004 | Gotthold | G01J 5/0007 374/208 |
| 2007/0107103 | A1* | 5/2007 | Kempa | B82Y 20/00 136/243 |
| 2008/0240652 | A1* | 10/2008 | Todori | G02B 6/1226 385/27 |
| 2010/0103553 | A1* | 4/2010 | Shimazawa | G02B 6/1226 250/493.1 |
| 2012/0082016 | A1* | 4/2012 | Komura | G02B 6/1228 385/37 |
| 2012/0127838 | A1* | 5/2012 | Komura | G11B 5/6088 369/13.32 |
| 2020/0386626 | A1* | 12/2020 | Zhang | G01Q 60/22 |

FOREIGN PATENT DOCUMENTS

| | | | | |
|---|---|---|---|---|
| DE | 102018131222 | A1 * | 6/2020 | G01J 1/0209 |
| EP | 1363113 | A2 * | 11/2003 | G01J 5/08 |
| WO | WO-2007018230 | A1 * | 2/2007 | B82Y 20/00 |
| WO | WO-2009085772 | A2 * | 7/2009 | B82Y 10/00 |
| WO | WO-2011033925 | A1 * | 3/2011 | B82Y 20/00 |
| WO | WO-2013093905 | A1 * | 6/2013 | G01B 11/00 |
| WO | WO-2020030223 | A1 * | 2/2020 | G01J 1/0429 |
| WO | WO-2020037175 | A1 * | 2/2020 | G01J 3/0208 |

OTHER PUBLICATIONS

"Spectral near-field thermal emission extraction by optical waveguides", J. Li, J. Wuenschell, Y. Jee, P. R. Ohodnicki, and S. Shen, Physical Review B 99, 235414 (2019).

"Plasmonic near-field probes: a comparison of the campanile geometry with other sharp tips", W. Bao, M. Staffaroni, J. Bokor, M. B. Salmeron, E. Yablonovitch, S. Cabrini, A. Weber-Bargioni, and P. J. Schuck, Optics Express 21 (7), 184982 (2013).

"Hybrid photonic-plasmonic near-field probe for efficient light conversion into the nanoscale hot spot", A. Koshelev, K. Munechika, and S. Cabrini, Optics Letters 42 (21), 4339 (2017).

"Campanile Near-Field Probes Fabricated by Nanoimprint Lithography on the Facet of an Optical Fiber", G. Calafiore et al., Scientific Reports 7: 1651, 01871 (2017).

* cited by examiner

HIGH TEMPERATURE NEAR-FIELD PROBE FOR SENSING AND ENERGY HARVESTING APPLICATIONS BASED UPON THERMAL EMISSION

CROSS-REFERENCE TO RELATED APPLICATIONS

This application claims priority under 35 U.S.C. § 119(e) from U.S. provisional patent application No. 63/011,377, titled "High Temperature Optical Fiber Devices for Sensing and Energy Harvesting Applications Based Upon Thermal Emission" and filed on Apr. 17, 2020, the contents of which are incorporated herein by reference.

BACKGROUND OF THE INVENTION

1. Field of the Invention

The present invention relates to optical sensing devices, and, in particular, to optical waveguide integrated near-field probes compatible with near-infrared electromagnetic radiation and high temperature applications above 500° C.

2. Description of the Related Art

Optical waveguide and optical fiber-based sensor technologies have emerged as an important area of technological research, particularly for harsh environment and high temperature applications where more conventional electrical-based sensors suffer from instabilities. One type of such an optical sensor is known as a near-field probe, which is a device that is used to sense an environmental parameter such as temperature and/or chemistry. More specifically, the output of a near-field probe is an optical signal having an intensity and/or spectral wavelength dependence that can be related to parameter(s) of interest. However, the ability to fully understand and quantify the capability for near-field thermal emission to be extracted using optical waveguide structures has been difficult to date because of the practical limitations in optical fiber device fabrication. In addition, the ability to develop near-field probes which are robust and deployable for practical applications, particularly in high temperatures and harsh environments, has been limited. There is thus room for improvement in the field of near-field probes.

SUMMARY OF THE INVENTION

In one embodiment, a near-field probe compatible with near-infrared electromagnetic radiation and high temperature applications above 300° C. (or 500° C. in some embodiments) is provided. The probe includes an optical waveguide and a photonic thermal emitting structure comprising a near-field thermally emissive material coupled to or part of the optical waveguide. The photonic thermal emitting structure is structured and configured to emit near-field energy responsive to at least one environmental parameter of interest, and the near-field probe is structured and configured to enable extraction of the near-field energy to a far-field by coupling the near-field energy into one or more guided modes of the optical waveguide.

In another embodiment, a near-field energy extraction method compatible with near-infrared electromagnetic radiation and high temperature applications above 300° C. (or 500° C. in some embodiments) is provided. The method includes emitting near-field energy responsive to at least one environmental parameter of interest from a photonic thermal emitting structure comprising a near-field thermally emissive material, wherein the photonic thermal emitting structure is coupled to or part of an optical waveguide, and extracting the near-field energy to a far field by coupling the near-field energy from the photonic thermal emitting structure into one or more guided modes of the optical waveguide.

In still another embodiment, a method for optimizing thermal emission from a photonic thermal emitting structure comprising a near-field thermally emissive material coupled to or part of an optical waveguide is provided. The method includes placing a set of dipole sources inside the photonic thermal emitting structure to mimic thermally excited current density, wherein a position, intensity and polarization of the dipole sources selected such that different sets of dipole sources are orthogonal to each other, thereby manifesting an incoherence nature of thermal sources, exciting thermal radiation of the photonic thermal emitting structure having the set of dipole sources; and responsive to the exciting, quantitatively calculating thermal emission from the photonic thermal emitting structure having the set of dipole source

DETAILED DESCRIPTION OF EXEMPLARY EMBODIMENTS

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" shall mean that two elements are directly in contact with each other.

As used herein, the term "number" shall mean one or an integer greater than one (i.e., a plurality).

As used herein, the term "near-field" shall mean a distance from a surface that is less than approximately 5 wavelengths of the energy that is radiated from and in the vicinity of the surface.

As used herein, the term "far-field" shall mean a distance from a surface that is greater than approximately 5 wavelengths of the energy that is radiated from the surface.

As used herein, the term "near-field thermal emission" shall mean thermally emitted electromagnetic radiation in the vicinity of an emitting surface that does not propagate to the far-field in absence of waveguide or other means of extraction.

As used herein, the term "near-field thermally emissive material" shall mean a material that exhibits a well-defined near-field thermal emission near the emitting surface of the material.

As used herein, the term "near-infrared plasmonic thermal emitter" shall mean a material that has a well-defined thermal emission near the surface of the material in the near-infrared wavelength range, associated with the excitation of free carriers which produces an amplification of electromagnetic fields in the near-field of a structure that includes the material.

As used herein, the term "high temperature stable plasmonic material" shall mean a material shall that exhibits an excitation of free carriers which produces an amplification of electromagnetic fields in the near-field of a structure that includes the material which is stable at temperatures of greater than approximately 300° C., and preferably greater than 500° C., more preferably greater than 800° C.

As used herein, the term "inorganic refractory dielectric material" shall mean an inorganic material which is largely transparent in the electromagnetic wavelength range of interest that is stable at high temperatures greater than 500° C., more preferably greater than 800° C., and most preferably greater than 1000° C.

As used herein, the term "nanostructure" shall mean a structure in which at least one characteristic dimension is less than approximately 1 micron, and in some cases less than 100 nm, and shall include, without limitation, both nanospheres and nanorods.

As used herein, the term "nanopore channels" shall mean open channels within a structure, such as an inorganic dielectric, having at least one characteristic dimension less than approximately 1 micron, and in some cases less than 100 nm.

As used herein, the term "high-index optical waveguide" shall mean an optical waveguide having a refractive index greater than a surrounding medium or layer (i.e. "cladding").

As used herein, the term "nano-gap" shall mean a gap that has a characteristic dimension of less than approximately 1 micron, and in some cases less than 100 nm.

As used herein, the term "Bragg reflector structure" shall mean a periodic modulation of the refractive index of an optical waveguide such as an optical fiber that results in a narrow-band reflection at a specified wavelength, also corresponding to a narrow-band reduced transmission at the same wavelength.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

As far-field thermal emission is limited by blackbody radiation, the significant enhancement of thermal radiation in the near-field plays a vital role in a variety of applications such as infrared sensing, radiation cooling and thermophotovoltaics. Yet the techniques of exporting the near-field signal to the far-field are still substantially less mature and typically requires sophisticated instrumentation which is not readily deployable in practical sensing applications. As described in detail herein in connection with various exemplary embodiments, the disclosed concept provides a new method of extracting near-field thermal radiation to the far-field by integrating complex photonic emitters with a high-index optical waveguide. Based on the fluctuation dissipation theorem and Wiener chaos expansion, the disclosed concept also provides a direct simulation method to design and optimize the thermal emission from the complex photonic structures that are coupled with an optical fiber. As discussed herein, the photonic thermal emitting structures can be fabricated at the end of the optical fiber, such as in campanile and ball lens implementations described herein, or coated on the surface or side of the fiber as a thin film structure (e.g., without limitation, an ITO film or a gold nanorod-based structure). With the novel waveguide coupled thermal extraction technique of the disclosed concept, near-field thermal emission can be efficiently extracted to the far-field by an almost infinitely long optical fiber (or other optical waveguide structure), and its spectral responses can then be characterized by the spectrometers connected to the optical fiber (or other optical waveguide).

The disclosed concept thus provides an optical waveguide integrated near-field probe compatible with near-infrared electromagnetic radiation and high temperature applications above 500° C. As discussed elsewhere herein, near-field probes are used for sensing of temperature or chemistry in the surrounding environment. More specifically, the probes measure the near-field emission of a sensing material that is provided as part of the probe (e.g., as described herein, the sensing material may be a photonic thermal emitting structure comprising a near-field thermally emissive material), and the sensing material near-field emission is responsive to various environmental parameters of interest. The output of such a probe is an optical signal with an intensity and/or spectral wavelength dependence that can be related to the sensed parameters of interest. As noted above and as described in detail herein, the near-field probe of the disclosed concept can be realized using nanofabrication and thin film deposition techniques to realize successful sensing and energy harvesting. One example of such a structure, again described in detail herein, is a campanile probe on the end-face of an optical fiber constructed of high temperature stable refractory materials and electrical conductors. The campanile probe can be used as-fabricated or can alternatively be integrated with thermally emissive functional materials to enable highly efficient extraction of near-field thermal emission to the far field. In other embodiments, a Bragg Reflector structure can be fabricated on an optical fiber to enable highly efficient near-field thermal extraction.

The near-field probe of the disclosed concept, functioning as a thermal emission extraction device, has a number of advantageous features, including: 1) plasmon to photon coupling capability in the near-IR or IR range, 2) high temperature operational capability optimally engineered for the wavelength range of peak thermal emission in moderate to extremely high temperature applications, 3) the integration of a thermally emissive material in or proximal to the region of electromagnetic field enhancement due to the plasmon to photon coupling probe, and 4) the application of a probe as just described for high temperature sensing applications and/or thermal energy extraction and harvesting applications. Moreover, an alternative embodiment provides a near-field thermal extraction device for sensing and/or thermal energy extraction applications that includes a Bragg reflector integrated on an optical waveguide, wherein the Bragg reflector is optimized for the near-IR or IR wavelength range and is comprised of high temperature stable refractory materials and/or conductors. Such a device may also integrate a thermally emissive material as a part thereof.

Figure 1:
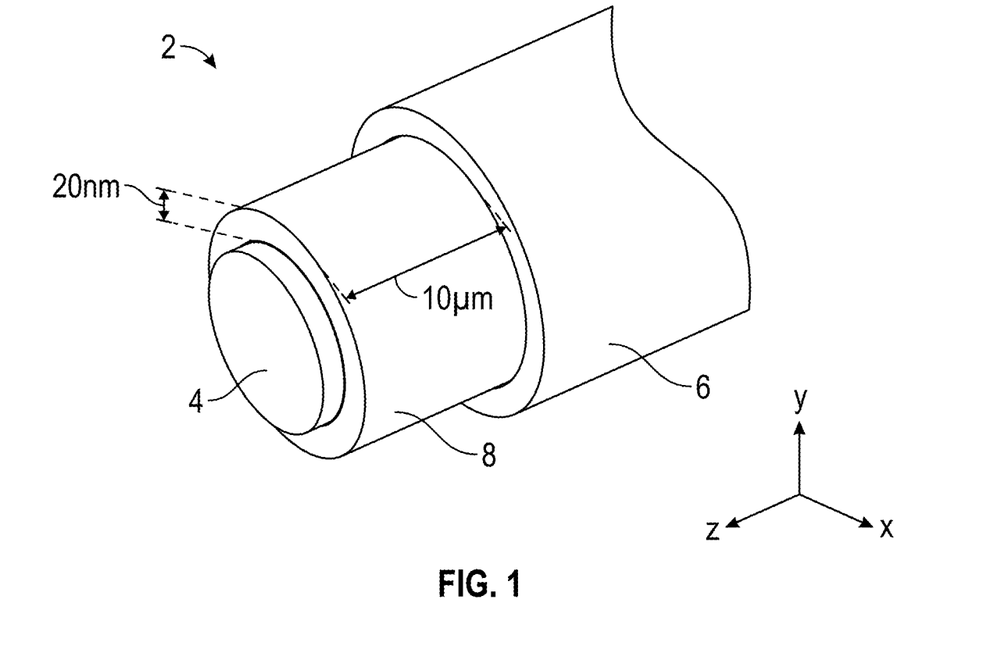
FIG. 1 is a schematic diagram of a near-field probe according to one exemplary embodiment of the disclosed concept.

FIG. 1 is a schematic diagram of a near-field probe 2 according to an exemplary embodiment of the disclosed concept. Near-field probe 2 includes a high-index optical waveguide in the form of an optical fiber member having a photonic thermal emitting structure comprising a near-field thermally emissive material operatively coupled thereto for coupling and extracting near-field energy to the far-field by way of guided modes of the waveguide. Once coupled into the guided modes, the electromagnetic radiation can be transmitted to the far-field (far from the thermal emitter) for measurement by standard optical components at near-ambient conditions. In the illustrated embodiment, optical fiber member is a cladded multi-mode silica fiber acting as a collection fiber for ultimate delivery of the energy to the far-field. More specifically, as seen in FIG. 1, near-field probe 2 includes an optical fiber having a core 4 surrounded by cladding 6. A portion (e.g., a length of approximately 10 μm) of cladding 6 has been removed and a photonic thermal emitting structure in the form of a thin film layer 8 is directly coupled and provided on core 4 at the location where cladding 6 has been removed. In the exemplary embodiment, thin film layer 8 is approximately 20 nm thick and comprises a Sn-doped $In_2O_3$ (ITO) thin film provided on the outer surface of core 4. The Sn-doped $In_2O_3$ (ITO) thin film in this embodiment is a near-field thermally emissive material.

In operation, near-field probe 2 extracts near-field thermal radiation generated by the sensing material of near field probe 2 in response to environmental parameters of interest to the far-field by way of evanescent coupling of evanescent waves to the waveguide comprising the optical fiber having core 4 and cladding 6. Evanescent waves are a near-field effect, and when the near-field emission of a emitter falls within the evanescent wave region of an optical waveguide, it allows for coupling of the near-field thermal emission to guided modes of the waveguide, which then allows it to be monitored in the far-field. The evanescent waves are an inherent part of a guided mode in a waveguide, as a fraction of the electromagnetic radiation energy "leaks" into the surrounding medium when it is guided in the core of a waveguide. This "leaking" is a near-field effect, and allows for near-field coupling with thermal emitters that have near-field electromagnetic radiation which overlaps.

Figure 2:
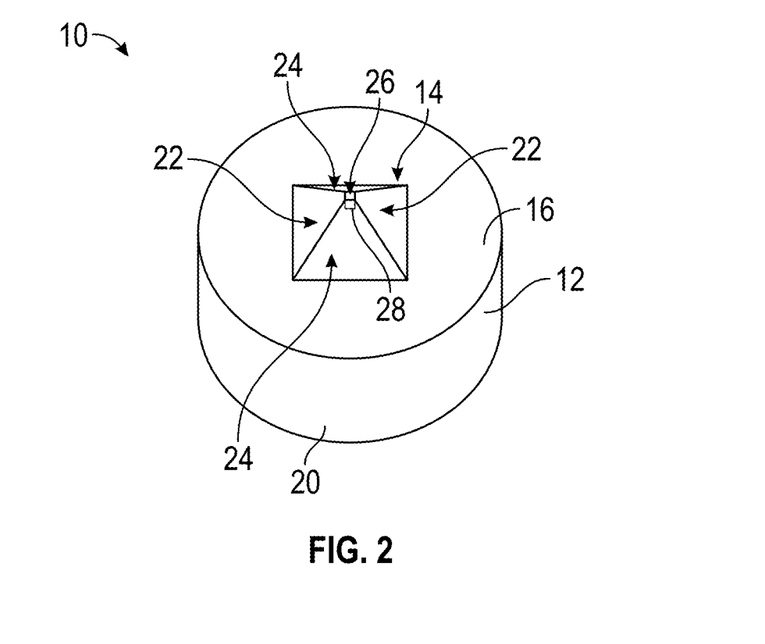
FIGS. 2 and 3 are isometric and cross-sectional schematic diagrams of a near-field probe according to an alternative exemplary embodiment of the disclosed concept.
Figure 3:
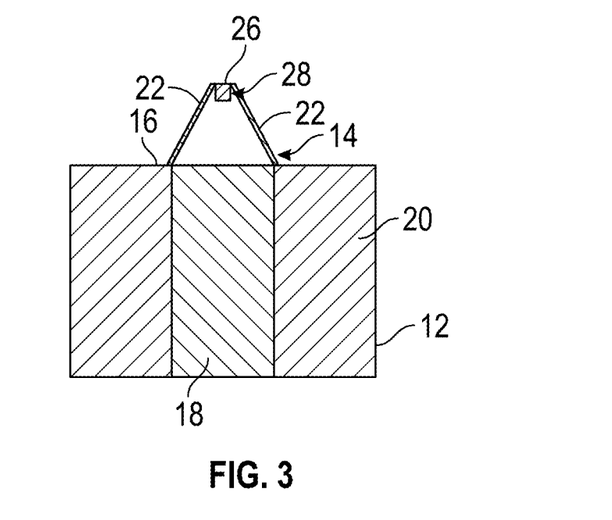

FIGS. 2 and 3 are isometric and cross-sectional schematic diagrams, respectively, of a near-field probe 10 according to an alternative exemplary embodiment of the disclosed concept. Near-field probe 10, like near-field probe 2, includes a high-index optical waveguide in the form of an optical fiber member having a photonic thermal emitting structure comprising a near-field thermally emissive material operatively coupled thereto for coupling near-field energy to the far-field by way of guided modes of the waveguide. As seen in FIGS. 2 and 3, near-field probe 10 is in the form of a campanile probe and includes an optical fiber member 12 and a pyramid-shaped near-field coupling structure 14 directly coupled to the end face or tip 16 of optical fiber member 12. In the exemplary embodiment, optical fiber member 12 is a cladded single-mode silica fiber acting as a collection fiber and includes a core 18 surrounded by cladding 20. As seen in FIG. 3, near-field coupling structure 14 is positioned directly over and is directly coupled to core 18.

In addition, as seen in FIGS. 2 and 3, in the exemplary embodiment, near-field coupling structure 14 includes first and second opposite faces (or facets) 22 made of a high temperature stable plasmonic material and third and fourth opposite faces (or facets) 24 made of a inorganic refractory dielectric material. Near-field coupling structure 14 further includes a nano-gap 26 (e.g., a gap of between approximately 100 and 200 nm) between the distal ends of the faces 22 and 24. In various exemplary embodiments, the high temperature stable plasmonic material may be one of gold (Au), a combination of gold and a dielectric such as titanium dioxide, alumina, silica, zirconia, strontium titanate, etc. (Au/dielectric), platinum (Pt) and a combination of PT and a dielectric, such as just described. In another exemplary embodiment, the refractory dielectric material includes one of silica and silicon nitride. In addition, as shown in FIGS. 2 and 3, near-field coupling structure 14 further includes a near-infrared plasmonic thermal emitter member 28 provided in nano-gap 26 and supported by distal ends of the faces 22, 24. In the exemplary embodiment, near-infrared plasmonic thermal emitter member 28 is a nanofabricated Sn-doped $In_2O_3$ (ITO) member, although other thermal emitters can be envisioned such as La-doped $SrTiO_3$, complex perovskite oxides such as $La_xSr_{1-x}Co_yFe_{1-y}O_{3-d}$, and others.

In this embodiment, near-field coupling structure 14 thus comprises an engineered antenna structure that is provided on the end face or tip 16 of optical fiber 14 such that near-infrared plasmonic thermal emitter member 28 is placed at the location of the enhanced near-field for the antenna. As a result, in operation, near-field probe 10 extracts near-field thermal radiation generated by the sensing material of near field probe 10 in response to environmental parameters of interest to the far-field by way of coupling to the waveguide comprising optical fiber 12.

Figure 4:
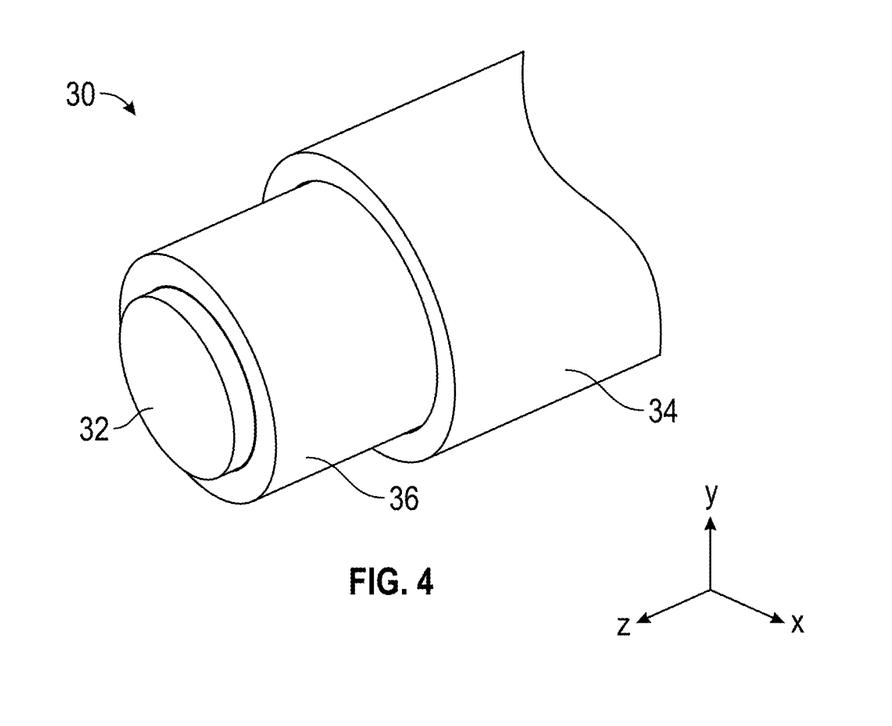
FIG. 4 is a schematic diagram of a near-field probe according to a further alternative exemplary embodiment of the disclosed concept.

FIG. 4 is a schematic diagram of a near-field probe 30 according to yet another exemplary embodiment of the disclosed concept. Near-field probe 30, like near-field probes 2 and 10, includes a high-index optical waveguide in the form of an optical fiber member having a photonic thermal emitting structure comprising a near-field thermally emissive material operatively coupled thereto for coupling and extracting near-field energy to the far-field by way of guided modes of the waveguide. In the illustrated embodiment, optical fiber member is a cladded sapphire fiber acting as a collection fiber for ultimate delivery of the energy to the far-field. More specifically, as seen in FIG. 4, near-field probe 30 includes an optical fiber member having a core 32 surrounded by cladding 34. A portion (e.g., a length of approximately 10 μm) of cladding 34 has been removed and a photonic thermal emitting structure in the form of a thin film gold nanostructure layer 36 (shown schematically in FIG. 5) is directly coupled to and provided on the outer surface of core 32 at the location where cladding 34 has been removed.

Figure 5:
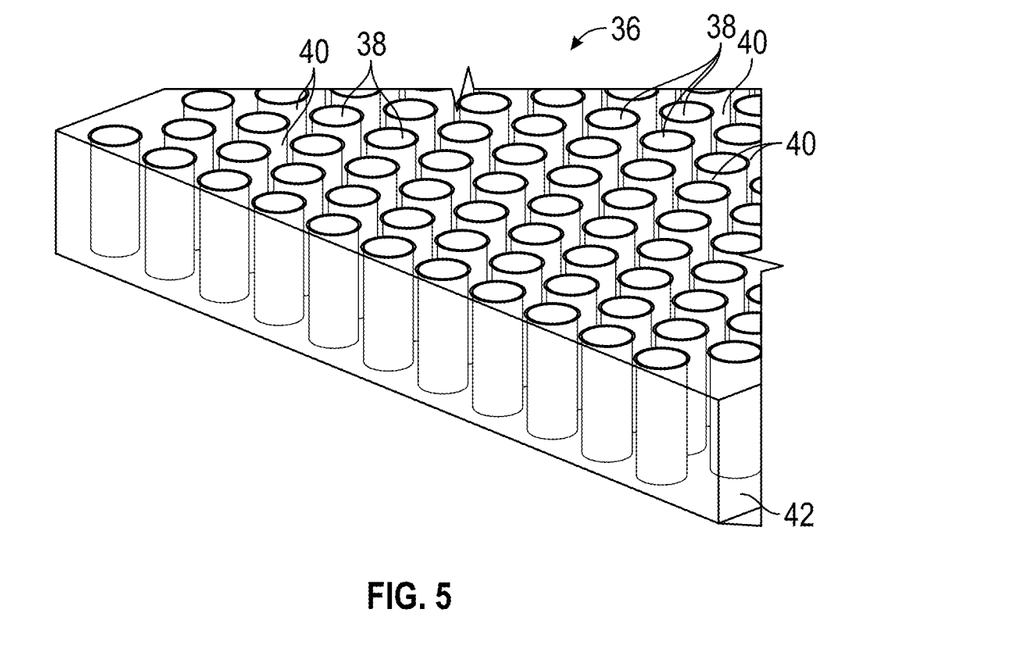
FIG. 5 is a schematic diagram of a thin film layer employed in the near-field probe of FIG. 4.

Referring to FIG. 5, a schematic diagram of gold nanostructure layer 36 according to the exemplary embodiment is provided. As seen in FIG. 5, gold nanostructure layer 36 includes a plurality of gold nanostructures 38 (which, in the illustrated exemplary embodiment, is each a gold nanorod, although other nanostructures are also possible) that are geometrically confined in a plurality of corresponding nanopore channels 40 of an anodic aluminum oxide (AAO)

layer 42. Gold nanostructures such as gold nanostructures 38 are advantageous for manipulating light in the visible and near-infrared range due to the excitation of localized surface plasmon resonance (LSPR). However, some LSPR modes of gold nanostructures such as gold nanostructures 38 only exist in the near-field, and as a result, these modes cannot be directly measured by traditional far-field thermal emission techniques. Thus, gold nanostructures layer 36 of the present embodiment of the disclosed concept allows for near-field coupling of LSPR modes to the far-field. More specifically, by coupling with the optical fiber member of near-field probe 30 in the near-field, the thermally excited LSPR modes from gold nanostructures 38 can be converted into the propagating modes in the optical fiber member of near-field probe 30 and measured remotely.

In addition, gold nanostructures with shape anisotropy are not stable and instead tend to change shape and agglomerate at relatively low temperatures due to their high surface energy and hence melting temperature depression with respect to bulk gold. Thus, by geometrically confining gold nanostructures 38 in nanopore channels 40 of layer 42 as shown in FIG. 5, this problem may be overcome.

Figure 6:
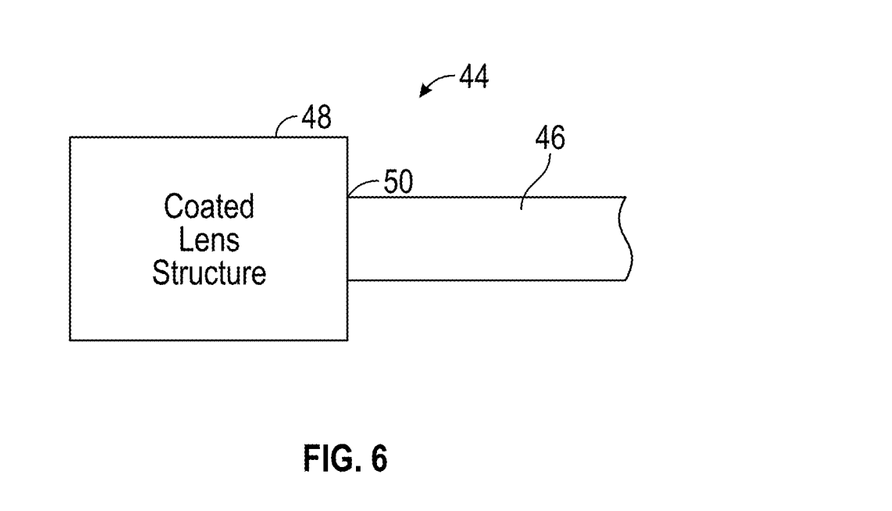
FIG. 6 is a schematic diagram of a near field probe according to yet a further alternative exemplary embodiment of the disclosed concept.

FIG. 6 is a schematic diagram of a near-field probe 44 according to another alternative exemplary embodiment of the disclosed concept. Near-field probe 44, like near-field probes 2, 10 and 30, includes a high-index optical waveguide in the form of an optical fiber member having a photonic thermal emitting structure comprising a near-field thermally emissive material operatively coupled thereto for coupling near-field energy to the far-field by way of guided modes of the waveguide. As seen in FIG. 6, near-field probe 44 includes an optical fiber member 46 and a near-field coupling structure comprising a coated lens structure 48 directly coupled to the end face or tip 50 of optical fiber member 46. In the exemplary embodiment, optical fiber member 46 is a cladded single-mode silica fiber acting as a collection fiber. In addition, coated lens structure 48 comprises a lens member, such as, without limitation a spherical ball lens, wherein the outer surface thereof is coated with a photonic thermal emitting material as a thin film. In the exemplary embodiment, photonic thermal emitting material comprises a Sn-doped $In_2O_3$ (ITO) thin film.

In this embodiment, coated lens structure 48 thus comprises an engineered lens structure that is provided on the end face or tip 50 of optical fiber 46. As a result, in operation, near-field probe 44 extracts near-field thermal radiation generated by the sensing material of near field probe 44 in response to environmental parameters of interest to the far-field by way of coupling to the waveguide comprising optical fiber member 46.

Figure 7:
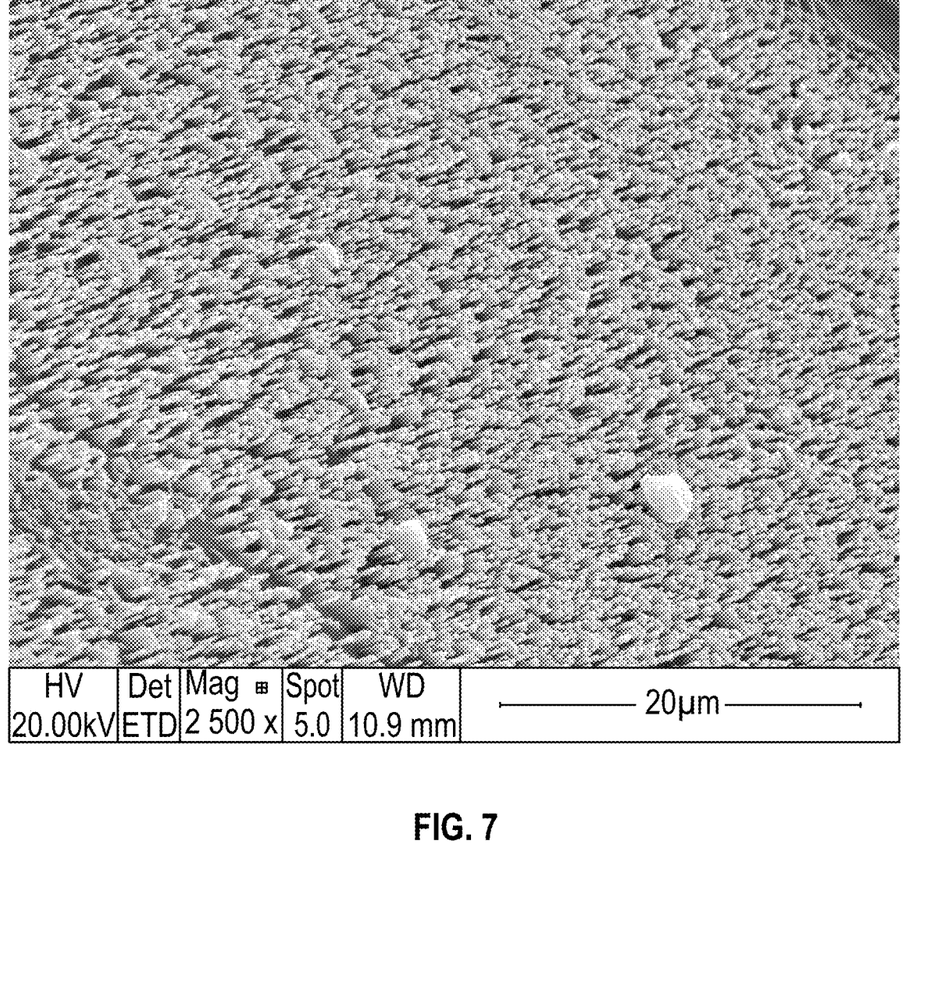
FIGS. 7 and 8 are images showing how optical waveguide members can be modified in order to enhance near-field thermal emission extraction according to a further aspect of the disclosed concept.
Figure 8:
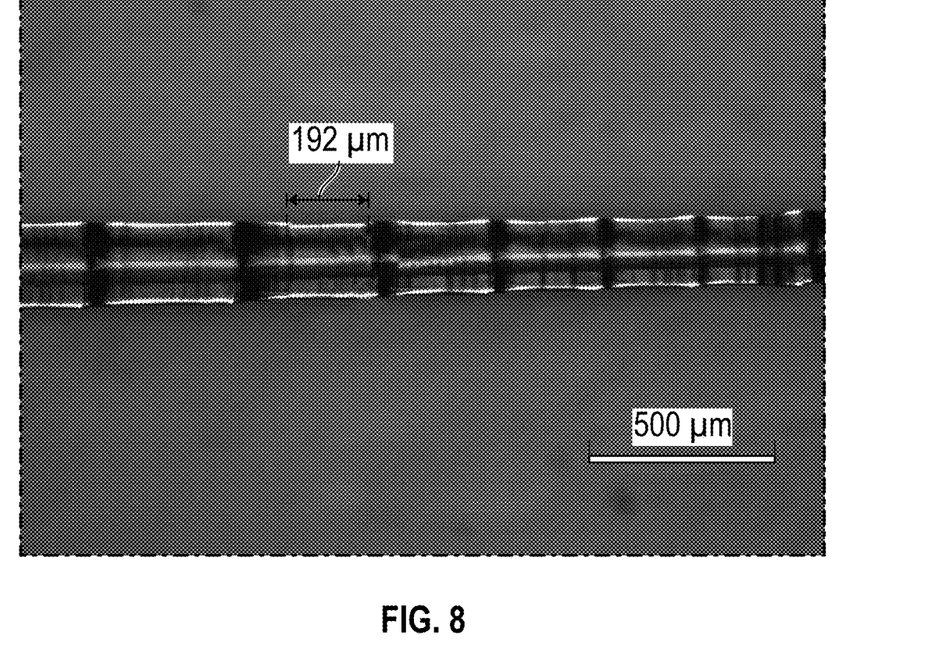

It still further alternative embodiments, the coupling of near-field thermal emissions into a high-index optical waveguide structure such as an optical fiber can be enhanced by altering the structure of the waveguide. For example, enhancement of near-field thermal emissions can be achieved by roughening the surface of the waveguide structure through techniques such as reactive ion etching as shown in FIG. 7, or by providing periodic perturbations of the waveguide structure as shown in FIG. 8, which can be referred to as a Bragg Reflector structure in some embodiments. Such perturbations to the waveguide structure provide additional pathways by which near-field electromagnetic radiation can be coupled to the guided modes of the waveguide (i.e. mode converters or mode couplers).

Figure 9:
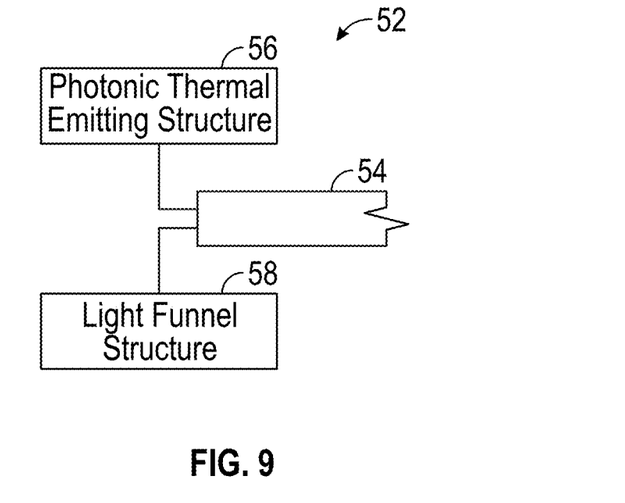
FIGS. 9 and 10 are schematic diagrams of a near-field probe according to yet further alternative exemplary embodiments.
Figure 10:
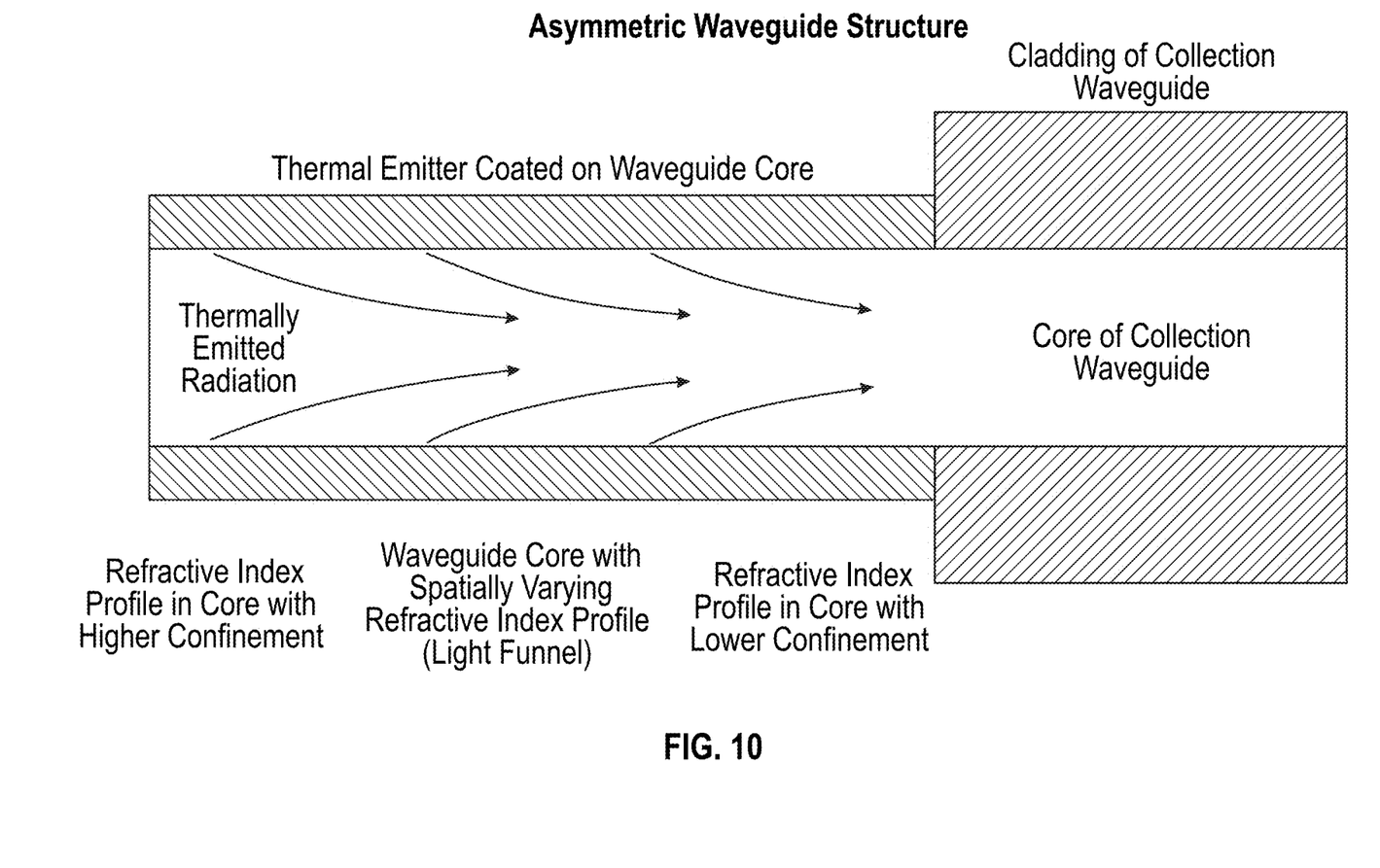

According to a further aspect of the disclosed concept, the collection of the thermal emission can be optimized by avoiding re-absorption of thermally emitted radiation via introducing asymmetry of the near-field probe through advanced designs at the location of the near-field emitter. Such design may include, without limitation, the following: 1) a tapered optical waveguide structure, 2) a spatially varying refractive index distribution within the waveguide, as in a graded refractive index waveguide, where the index contrast depends on the location along the waveguide axis, or 3) a ball-lens or other optical structure. Such designs, referred to herein as "light funnels," allow emitted light to be collected in the guided modes without interacting with the thermal emitter in other regions that would cause re-absorption and hence a reduction in total collected emission. An exemplary embodiment of a near-field probe employing such a light funnel is shown schematically in FIG. 9. More specifically, as seen in FIG. 9, near-field probe 52 includes a waveguide (e.g., optical fiber) 54, a photonic thermal emitting structure 56, and a light funnel structure 58. Moreover, FIG. 10 is a schematic diagram of a near-field probe according to this aspect of the disclosed concept that, as described above, employs a spatially varying refractive index distribution within the waveguide, where the index contrast depends on the location along the waveguide axis.

As noted elsewhere herein, the disclosed concept also provides a direct simulation method to design and optimize the thermal emission from the complex photonic structures that are coupled with an optical fiber. In particular, the direct simulation of thermal emission from photonic structures (e.g., gold nanorods) is conducted based on the Wiener-chaos expansion (WCE) method using a finite-different time-domain (FDTD) calculation. In the method, a set of dipole source arrays is put inside the photonic structure to mimic the thermally excited current density. The position, intensity and polarization of the dipole sources inside the structure is carefully designed such that different sets of dipole sources are orthogonal to each other, which manifests the incoherence nature of thermal sources. One or more simulations then involve exciting thermal radiation of the photonic structure having the set of dipole sources therein. From the simulations, the thermal emission from arbitrary complex photonic structures coupled with an optical fiber can be quantitatively calculated. Again, in this aspect of the disclosed concept, the direct simulation method can be used to design and optimize the fiber coupled optical system.

In the claims, any reference signs placed between parentheses shall not be construed as limiting the claim. The word "comprising" or "including" does not exclude presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A near-field probe compatible with near-infrared electromagnetic radiation, comprising:
an optical waveguide; and
a photonic thermal emitting structure comprising a near-field thermally emissive material coupled to or part of the optical waveguide, wherein the photonic thermal emitting structure is structured and configured to emit near-field energy responsive to at least one environmental parameter of interest, and wherein the near-field probe is structured and configured to enable extraction of the near-field energy to a far-field by coupling the near-field energy into one or more guided modes of the optical waveguide, wherein the optical waveguide comprises an optical fiber having a core, wherein the photonic thermal emitting structure is provided on an end face of the core, wherein the photonic thermal emitting structure comprises a pyramid member, wherein the pyramid member includes a number of first faces made of a high temperature stable plasmonic material and a number of second faces made of an inorganic refractory dielectric material, wherein the photonic thermal emitting structure includes a nano-gap between distal ends of the number of first faces and the number of second faces, and wherein the near-field thermally emissive material is provided in the nano-gap.

2. The near-field probe according to claim 1, wherein the high temperature stable plasmonic material comprises one of Au, Au/dielectric, Pt, and Pt/dielectric.

3. The near-field probe according to claim 1, wherein the inorganic refractory dielectric material comprises one of silica and silicon nitride.

4. The optical fiber integrated near-field probe according to claim 1, wherein the near-field thermally emissive material comprises a near-infrared plasmonic thermal emitter provided in the nano-gap.

5. The optical fiber integrated near-field probe according to claim 4, wherein the near-infrared plasmonic thermal emitter comprises at least one of an Sn-doped $In_2O_3$ (ITO) member, an La-doped $SrTiO3$ member, or an $La_xSr_{1-x}Co_yFe_{1-y}O_{3-d}$ member.

6. A near-field energy extraction method compatible with near-infrared electromagnetic radiation, the method comprising:
emitting near-field energy responsive to at least one environmental parameter of interest from a photonic thermal emitting structure comprising a near-field thermally emissive material, wherein the photonic thermal emitting structure is coupled to or part of an optical waveguide; and
extracting the near-field energy to a far field by coupling the near-field energy from the photonic thermal emitting structure into one or more guided modes of the optical waveguide, wherein the optical waveguide comprises an optical fiber having a core, wherein the photonic thermal emitting structure is provided on an end face of the core, wherein the photonic thermal emitting structure comprises a pyramid member, wherein the pyramid member includes a number of first faces made of a high temperature stable plasmonic material and a number of second faces made of an inorganic refractory dielectric material, wherein the photonic thermal emitting structure includes a nano-gap between distal ends of the number of first faces and the number of second faces, and wherein the near-field thermally emissive material is provided in the nano-gap.

7. A near-field probe compatible with near-infrared electromagnetic radiation, comprising:
an optical waveguide;
a photonic thermal emitting structure comprising a near-field thermally emissive material coupled to or part of the optical waveguide, wherein the photonic thermal emitting structure is structured and configured to emit near-field energy responsive to at least one environmental parameter of interest, and wherein the near-field probe is structured and configured to enable extraction of the near-field energy to a far-field by coupling the near-field energy into one or more guided modes of the optical waveguide; and
a light funnel structure positioned near a location of the photonic thermal emitting structure, wherein the light funnel structure is structured and configured for avoiding re-absorption of thermally emitted radiation by introducing asymmetry to the near-field probe.

8. The near-field probe according to claim 7, wherein the light funnel structure includes at least one of (i) a tapered optical waveguide structure, (ii) a spatially varying refractive index distribution within the optical waveguide, or (iii) a lens structure.

9. The near-field energy extraction method according to claim 6, wherein the method is compatible with high temperature applications above 500° C.

* * * * *